(12) United States Patent
Quentin et al.

(10) Patent No.: US 11,232,430 B2
(45) Date of Patent: Jan. 25, 2022

(54) METHOD FOR PROCESSING A TRANSACTION FROM A COMMUNICATION TERMINAL

(71) Applicant: INGENICO GROUP, Paris (FR)

(72) Inventors: Pierre Quentin, Enghien les Bains (FR); Jean-Bernard Blanchet, Paris (FR)

(73) Assignee: INGENICO GROUP, Paris (FR)

( * ) Notice: Subject to any disclaimer, the term of this patent is extended or adjusted under 35 U.S.C. 154(b) by 314 days.

(21) Appl. No.: 15/542,591

(22) PCT Filed: Jan. 8, 2016

(86) PCT No.: PCT/EP2016/050317
§ 371 (c)(1),
(2) Date: Jul. 10, 2017

(87) PCT Pub. No.: WO2016/110589
PCT Pub. Date: Jul. 14, 2016

(65) Prior Publication Data
US 2018/0025343 A1    Jan. 25, 2018

(30) Foreign Application Priority Data

Jan. 9, 2015 (FR) .................................. 1550191
Jan. 9, 2015 (FR) .................................. 1550192
(Continued)

(51) Int. Cl.
*G06Q 20/32* (2012.01)
*G06Q 20/40* (2012.01)
(Continued)

(52) U.S. Cl.
CPC ......... *G06Q 20/3227* (2013.01); *G06F 21/53* (2013.01); *G06Q 20/02* (2013.01);
(Continued)

(58) Field of Classification Search
None
See application file for complete search history.

(56) References Cited

U.S. PATENT DOCUMENTS 7,434,723 B1   10/2008  White et al.
2003/0145205 A1*  7/2003  Sarcanin .............. G06Q 20/027
                                       713/172
(Continued)

FOREIGN PATENT DOCUMENTS

DE   102011109318 A1    2/2013
EP        1349032 A1 * 10/2003    ........... H04L 9/3271
(Continued)

OTHER PUBLICATIONS

"EMV Integrated Circuit Card Specifications for Payment Systems" Book 3, Application Specification, Version 4.3, Nov. 2011.*
(Continued)

*Primary Examiner* — Neha Patel
*Assistant Examiner* — Clay C Lee
(74) *Attorney, Agent, or Firm* — David D. Brush; Westman, Champlin & Koehler, P.A.

(57) ABSTRACT

A method for the processing, by a transaction-processing server, of a transaction at least partially initiated from a communications terminal connectable to the server by using a communications network. This method includes: creating a secured communications channel with the communications terminal; instantiation, within an execution server on the communications network, of a virtual payment terminal capable of exchanging information with the communications terminal by using the secured communications channel; and processing a transaction between the communications terminal and the virtual payment terminal implementing at least one secure element of the communi-
(Continued)

cations terminal, the secure element being configured to exchange an identifier of the type of service.

4 Claims, 3 Drawing Sheets

(30) Foreign Application Priority Data

Jan. 9, 2015 (FR) ..................................... 1550193
Feb. 13, 2015 (FR) ..................................... 1551240

(51) Int. Cl.
| | |
|---|---|
| G06F 21/53 | (2013.01) |
| G06Q 20/42 | (2012.01) |
| H04L 9/32 | (2006.01) |
| H04L 29/06 | (2006.01) |
| H04W 12/08 | (2021.01) |
| G06Q 20/02 | (2012.01) |
| G06Q 20/34 | (2012.01) |
| H04W 12/12 | (2021.01) |
| G06Q 20/22 | (2012.01) |
| H04L 29/08 | (2006.01) |
| H04W 12/47 | (2021.01) |

(52) U.S. Cl.
CPC ....... *G06Q 20/2295* (2020.05); *G06Q 20/351* (2013.01); *G06Q 20/40* (2013.01); *G06Q 20/401* (2013.01); *G06Q 20/405* (2013.01); *G06Q 20/4012* (2013.01); *G06Q 20/40145* (2013.01); *G06Q 20/40975* (2013.01); *G06Q 20/42* (2013.01); *H04L 9/3226* (2013.01); *H04L 63/0428* (2013.01); *H04L 63/10* (2013.01); *H04L 63/101* (2013.01); *H04L 67/16* (2013.01); *H04W 12/08* (2013.01); *H04W 12/12* (2013.01); *G06Q 2220/00* (2013.01); *H04L 67/34* (2013.01); *H04L 67/42* (2013.01); *H04W 12/47* (2021.01)

(56) References Cited

U.S. PATENT DOCUMENTS

| | | | |
|---|---|---|---|
| 2007/0078760 A1 | 4/2007 | Conaty et al. | |
| 2008/0320597 A1* | 12/2008 | Hochfield | G06Q 20/367 726/26 |
| 2009/0294526 A1* | 12/2009 | Maw | G06K 7/0008 235/380 |
| 2010/0114733 A1 | 5/2010 | Collas et al. | |
| 2010/0145850 A1 | 6/2010 | Nagai et al. | |
| 2011/0078081 A1* | 3/2011 | Pirzadeh | H04L 12/14 705/44 |
| 2011/0238569 A1 | 9/2011 | Kim et al. | |
| 2012/0069772 A1* | 3/2012 | Byrne | H04W 88/06 370/255 |
| 2012/0123883 A1 | 5/2012 | Charrat | |
| 2013/0221092 A1 | 8/2013 | Kushevsky et al. | |
| 2013/0301830 A1 | 11/2013 | Bar-El et al. | |
| 2014/0066015 A1 | 3/2014 | Aissi | |
| 2014/0074655 A1 | 3/2014 | Lim et al. | |
| 2014/0074714 A1 | 3/2014 | Melone et al. | |
| 2014/0287683 A1* | 9/2014 | Rankl | G06Q 30/0601 455/41.1 |
| 2014/0317686 A1 | 10/2014 | Vetillard | |
| 2015/0004934 A1 | 1/2015 | Qian et al. | |
| 2015/0007335 A1* | 1/2015 | Buer | G06F 21/74 726/26 |
| 2015/0120472 A1 | 4/2015 | Aabye et al. | |
| 2015/0181410 A1* | 6/2015 | Liu | H04W 88/02 455/419 |
| 2015/0378581 A1 | 12/2015 | Dietz | |
| 2016/0063480 A1 | 3/2016 | Ballesteros et al. | |
| 2017/0142090 A1 | 5/2017 | Mahaffey et al. | |
| 2017/0251369 A1 | 8/2017 | Alberti et al. | |

FOREIGN PATENT DOCUMENTS

| | | |
|---|---|---|
| EP | 2157540 A1 | 2/2010 |
| EP | 2455922 A1 | 5/2012 |
| EP | 2746981 A1 | 6/2014 |
| WO | 2004072914 A1 | 8/2004 |
| WO | 2012154915 A1 | 11/2012 |
| WO | 2013078499 A1 | 6/2013 |
| WO | 2013117061 A1 | 8/2013 |

OTHER PUBLICATIONS

"EMV Integrated Circuit Card Specification for Payment Systems", Book 3, Application Specification, Version 4.3, Nov. 2011 (Year: 2011).*
Aljohani, "A Unified Payment Transaction Exchange Service (UMTES) for Next-Generation Mobile Networks", Sep. 2014, University of South Wales, pp. 93-95 (Year: 2014).*
Office Action dated Nov. 29, 2018 from the United States Patent and Trademark Office for corresponding U.S. Appl. No. 15/542,436, filed Jul. 9, 2017.
International Search Report dated Mar. 10, 2016 for corresponding International Application No. PCT/EP2016/050316, filed Jan. 8, 2016.
Written Opinion of the International Searching Authority dated Mar. 10, 2016 for corresponding International Application No. PCT/EP2016/050316, filed Jan. 8, 2016.
International Search Report dated Mar. 10, 2016 for corresponding International Application No. PCT/EP2016/050318, filed Jan. 8, 2016.
Written Opinion of the International Searching Authority dated Mar. 10, 2016 for corresponding International Application No. PCT/EP2016/050318, filed Jan. 8, 2016.
English translation of the Written Opinion of the International Searching Authority dated May 29, 2017 for corresponding International Application No. PCT/EP2016/050316, filed Jan. 8, 2016.
English translation of the Written Opinion of the International Searching Authority dated Jun. 1, 2017 for corresponding International Application No. PCT/EP2016/050317, filed Jan. 8, 2016.
English translation of the Written Opinion of the International Searching Authority dated May 29, 2017 for corresponding International Application No. PCT/EP2016/050318, filed Jan. 8, 2016.
"EMV Mobile Contactless Payment: Technical Issues and Positions Paper", Internet Citation, Oct. 1, 2007 (Oct. 1, 2007), pp. 1-37, XP007908266.
Office Action dated Jun. 10, 2019 for corresponding U.S. Appl. No. 15/542,437, filed Jul. 9, 2017.
Notice of Allowance dated Mar. 20, 2019 for related U.S. Appl. No. 15/542,436, filed Jul. 9, 2017.
International Search Report dated Mar. 10, 2016 for corresponding International Application No. PCT/EP2016/050317, filed Jan. 8, 2016.
Written Opinion of the International Searching Authority dated Jul. 14, 2016 for corresponding International Application No. PCT/EP2016/050317, filed Jan. 8, 2016.
Notice of Allowance dated Jul. 1, 2019 from the USPTO for corresponding U.S. Appl. No. 15/542,436, filed Jul. 9, 2017.
Corrected Notice of Allowability dated Aug. 14, 2019 from the USPTO for corresponding U.S. Appl. No. 15/542,436, filed Jul. 9, 2017.
Notice of Allowance dated Sep. 9, 2019 from the USPTO for corresponding U.S. Appl. No. 15/542,436, filed Jul. 9, 2017.
Final Office Action dated Jan. 13, 2020 from the USPTO for corresponding U.S. Appl. No. 15/542,437, filed Jul. 9, 2017.
Notice of Allowance dated Dec. 17, 2020 from the United States Patent and Trademark Office for corresponding U.S. Appl. No. 15/542,437, filed Jul. 9, 2017.

* cited by examiner

METHOD FOR PROCESSING A TRANSACTION FROM A COMMUNICATION TERMINAL

CROSS-REFERENCE TO RELATED APPLICATIONS

This Application is a Section 371 National Stage Application of International Application No. PCT/EP2016/050317, filed Jan. 8, 2016, which is incorporated by reference in its entirety and published as WO 2016/110589 A1 on Jul. 14, 2016, not in English.

1. FIELD OF THE INVENTION

The proposed technique relates to the online processing of transactions, and more particularly to the processing of transactions using a communications terminal in a secured form.

2. PRIOR ART

There are two modes of transactions that co-exist when a user wishes to carry out a payment transaction using a bank card:

A "card present" mode: the bank card is used physically. It is for example inserted into a payment terminal and the information that it contains is read directly from the chip or the magnetic stripe integrated into the card. As an alternative, the bank card is brought close to a payment terminal and the information is transmitted via an NFC (Near Field Communication) type of contactless technology;

A "card not present" mode: the bank card is not used physically but the user enters the information present on this card (card number, visual cryptogram, expiry date, bearer's name) to make a transaction. This is the solution that is predominantly used today for online payment on the Internet.

Many manufacturers of mobile communications terminals (typically smartphones and tablets) are seeking today to develop payment solutions directly integrated with the mobile terminal, enabling the user avert the need to use his bank card when he wishes to make a transaction with this mobile terminal.

The solutions proposed for this purpose rely essentially on an implementation based on the "card not present" type of transaction mode, described here above: in a first phase of initializing the service, the user is asked to enter the information associated with his bank card or cards (for example the type of card, the card number, the visual cryptogram, the expiry date etc.) in a dedicated application installed in his communications terminal. This information is then stored within the communications terminal itself. When this initialization phase is completed, the user can use the dedicated application to make certain payments without needing to carry his bank card with him and without having to manually re-enter the information indicated on his bank card: this information is directly transmitted by the communications terminal to the payment server.

This solution however is limited. On the one hand, the possibilities of transactions accessible from a mobile communications terminal are limited and relate only to online transactions relying on a "card not present" mode, and the proposed solution is then aimed essentially at avoiding the need for the user himself to enter the data associated with his bank card whenever he wishes to make a payment from a communications terminal (an often tedious entry procedure). Moreover, this approach raises security-related problems: since all the data needed to make a transaction is stored within the communications terminal itself, a user who has mislaid his mobile device (his cell phone for example) or had it stolen from him will not be safe from a situation where a malicious person who has retrieved his phone then accesses sensitive information and makes financial transactions in his name (if the communications terminal or application containing this information is insufficiently secured for example).

This problem of securing which arises when making payment transactions from a communications terminal is also encountered when making transactions of other types: if authorization is required to make a transaction from a communications terminal, it is risky to store information enabling access to such authorization within this very communications terminal.

There is therefore a need for a solution to integrate means for obtaining authorizing for transactions into a communications terminal, without incurring at least some of these prior-art problems.

3. SUMMARY

The proposed technique offers a solution that does not have at least some of the problems of the prior art, through an original method for processing a transaction at least partially initiated from a communications terminal. According to a first aspect of the proposed technique, such a method is implemented within a transaction-processing server connected to said communications terminal by means of a communications network, and it comprises:

a step for creating a secured communications channel with the communications terminal;

a step of instantiation, within an execution server on said communications network, of a virtual payment terminal capable of exchanging information with said communications terminal by means of said secured communications channel;

a step for processing a transaction between the communications terminal and the virtual payment terminal implementing at least one secure element of the communications terminal, said secure element being configured to exchange an identifier of a type of service.

Thus, the transaction-processing server is capable of instantiating virtual payment terminal capable of communicating with a secure element of a communications terminal for the processing of a transaction.

In one particular embodiment, the step for processing a transaction comprises at least one data exchange in the form of an APDU between the secure element and the virtual payment terminal.

Thus, the communications protocol used for the exchanges of data between the secure element and the virtual payment module is similar to the one implemented during exchanges between a physical bank card and a physical payment terminal, i.e. in a "card present" type mode.

In one particular embodiment of the proposed technique, said step for processing transactions comprises:

a step of reception, from said virtual payment terminal, of an identifier representing the type of said transaction to be processed, an index representing a set of data useful for the processing of said transaction and a personal identification number entered into said communications terminal;

a step for verifying that there is a match between said personal identification number entered and a personal identification number expected for said type of transaction to be processed;

when said verification is positive, a step for obtaining data useful to continue the transaction, as a function of said identifier representing the type of said transaction to be processed and said index representing a set of data useful for the processing of said transaction;

a step for transmitting said set of data to a third-party server capable of carrying out the transaction.

In this way, the process of obtaining an authorization for making a transaction through a communications terminal is similar to the one made during a payment transaction in "card present" mode (the secure element of the communications terminal then acts as a bank card, by means of at least one applet that is installed therein and the virtual payment terminal behaves like a classic payment terminal). Besides, once this authorization is obtained, the rest of the transaction continues in a "card not present" type of mode. Thus, a hybrid transaction mode is defined, enabling the performance of a transaction through a communications terminal while obtaining the same advantages in terms of increased security that would have been obtained by using a bank card in a "card present" mode.

In yet another embodiment of the proposed technique, the method of processing a transaction comprises, prior to the step for creating a secured communications channel with the communications terminal, a step for receiving at least one request for registering said communications terminal with said transaction-processing server.

Thus, the transaction-processing server is capable of determining whether a communications terminal is effectively powered on and therefore available to participate in the implementing of the processing of a transaction according to the proposed technique.

In yet another embodiment, the method for processing a transaction comprises, prior to the step for creating a secured communications channel with the communications terminal, a step for receiving a request for initializing a transaction coming from a merchant server.

In this way, the transaction-processing server is alerted to the initializing of a transaction with a merchant site.

In one particular embodiment of the proposed technique, said identifier of the type of service is composed of sixteen digits.

Thus, an identifier of the type of service is itself built on the model of a classic bank card number and is therefore fully compatible with APDU type exchanges.

According to yet another particular embodiment of the proposed technique, the index representing a set of data associated with said type of service is transmitted to the virtual payment terminal in the 9F10 field of an APDU transmitted between the secure element and said virtual payment terminal during the step for processing the transaction.

In this way, the available 9F10 field of an APDU message is profitably used to transmit the index representing a set of data to be used to the virtual payment terminal, while complying with the framework of an APDU message.

According to another aspect, the proposed technique also relates to a method for provisioning a virtual card within a communications terminal, said virtual card being derived from a bank card of a user of said communications terminal. Such a method comprises:

a step for selecting a type of service with which said virtual card must be associated, among a set of types of services pre-defined within said communications terminal;

a step for obtaining a set of data coming from said bank card;

a step for registering a representation of said bank card, said representation belonging to the group comprising:
 a photograph of said bank card;
 an image representation of said bank card;
 a sub-set of the card number of said bank card;

a step for generating and storing an index (IDX) associated with said set of data.

In this way, a user has the possibility of provisioning several virtual cards derived from bank cards in his possession within a same communications terminal within which several types of service are pre-defined (for example Visa® payment, MasterCard® payment etc.). Registering a representation of provisioned bank cards enables a user to know which cards he has provisioned and, if necessary, to select the one that he wishes to use when he makes a transaction. The index enables the communications terminal to distinguish several virtual cards which are provisioned for a same type of service.

In one particular embodiment of the proposed technique, the communications terminal is connected to a transaction-processing server by means of a communications network and the method for provisioning a virtual card furthermore comprises a step of transmission to said transaction-processing server of said set of data coming from the bank card on the one hand and said associated index and an identifier of said selected type of service on the other hand.

It is thus possible, within a data structure of said transaction-processing server, to associate said set of data with said associated index and with said identifier of the type of service considered. Thus, the set of data coming from the bank card, that constitutes sensitive data, no longer needs to be stored within said communications terminal. The only information that remains stored within the communications terminal, in addition to the predefined identifiers of the types of service, are the index as well as the representation of the bank card.

According to yet another aspect, the proposed technique also relates to a transaction-processing server for processing transactions at least partially initiated from a communications terminal connected to said server by means of a communications network. Such a server comprises:

means for creating a secured communications channel with said communications terminal;

means of instantiation, within an execution server on said communications network, of a virtual payment terminal capable of exchanging information with said communications terminal by means of said secured communications channel;

transaction-processing means for processing transactions between the communications terminal and said virtual payment terminal implementing at least one secure element of said communications terminal, said secure element being configured to exchange an identifier of the type of service.

According to another aspect, the proposed technique also relates to a communications terminal comprising means for provisioning a virtual card representing a user's bank card, said communications terminal comprising:

means for selecting a type of service with which said virtual card must be associated, from among a set of types of pre-defined services within said communications terminal;

means for obtaining a set of data associated with said bank card;

means for registering a representation of said bank card, said representation belonging to the group comprising:
a photograph of said bank card;
an image representation of said bank card;
a sub-set of the card number of the said bank card;

means for generating and storing an index (IDX) associated with said set of data.

According to a preferred implementation, the different steps of the methods according to the proposed technique are implemented by one or more software programs or computer programs comprising software instructions to be executed by a data processor of a relay module according to the proposed technique and being designed to control the execution of different steps of the methods.

The proposed technique is therefore also aimed at providing a program capable of being executed by a computer or by a data processor, this program comprising instructions to command the execution of the steps of a method as mentioned here above.

This program can use any programming language whatsoever and be in the form of source code, object code or intermediate code between source code and object code such as in a partially compiled form or in any other desirable form whatsoever.

The proposed technique is also aimed at providing an information carrier readable by a data processor and comprising instructions of a program as mentioned here above.

The information carrier can be any entity or device whatsoever capable of storing the program. For example, the carrier can comprise a storage means such as a ROM, for example, a CD ROM or microelectronic circuit ROM or again a magnetic recording means, for example a floppy disk or a hard disk drive.

Furthermore, the information carrier can be a transmissible carrier such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, smart card, a memory card, an electronic board for the execution of firmware etc.

Each component of the system described here above can of course implement its own software components.

The different embodiments mentioned here above can be combined with one another to implement the proposed technique.

4. FIGURES

Other features and advantages of the invention shall appear more clearly from the reading of the following description of different embodiments, given by way of simple illustratory and non-exhaustive examples and from the appended drawings, of which;

FIG. 1 describes a simplified architecture of a communications terminal capable of being used in the context of the implementation of the proposed technique, according to one particular embodiment;

Figure 4:
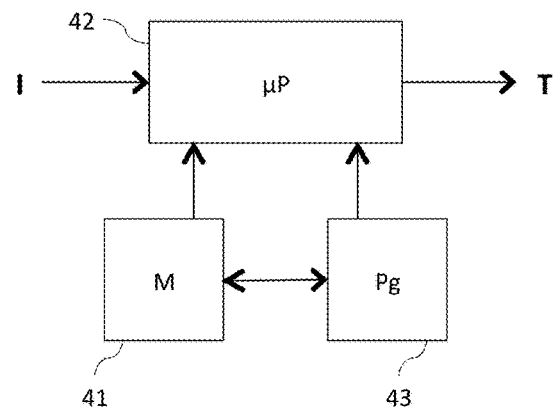

FIG. 4 describes a simplified architecture of a transaction-processing server according to one particular embodiment of the proposed technique.

5. DESCRIPTION

The proposed technique does not have at least some of these problems of the prior art. Indeed, the invention herein proposes a method for processing a transaction made online, that relies on the use of a communications terminal to obtain an authorization to carry out said transaction. This communications terminal has hardware and software means to ensure enhanced security for the transaction.

The general principle of the proposed technique consists in relying on the same mechanisms of authentication as those used in a payment transaction using a bank card in a "card present" mode and in repeating these mechanisms in order to obtain authorization for carrying out any transaction whatsoever (not only payment transactions) from a communications terminal. In other words, the invention proposes a technique of hybrid processing adapted to the problems posed by communications terminals, namely a technique in which reinforced security is obtained for transactions performed by means of communications terminals through the entry of a personal identification code. This technique comprises several sections: the provisioning of the communications terminal, in which bank card data is furnished to the communications terminal; the implementing of a transaction. The devices used to implement the techniques described are also presented.

5.1 Provisioning of the Communications Terminal

Figure 1:
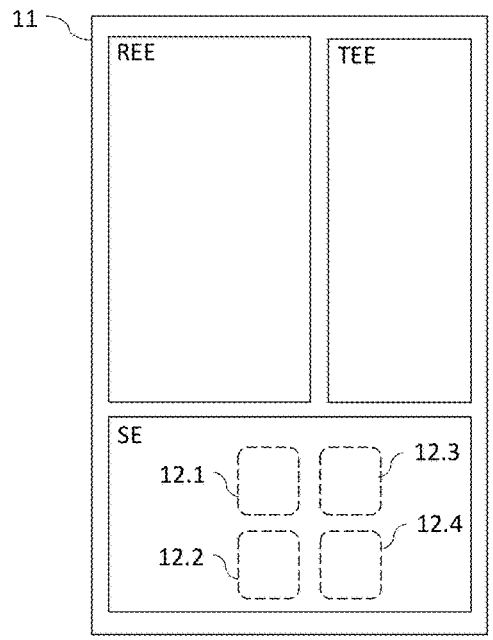

Referring to FIG. 1, a simplified architecture is presented of a communications terminal (11) capable of being used in the context of the implementation of the proposed technique, in one particular embodiment. Such a communications terminal (11) comprises a secured processor having access to a secured memory. This secured processor and this secured memory are, if necessary, distinct from the central processor and the central memory which govern the day-to-day functioning (taking calls, sending messages, Internet browsing, day-to-day application execution etc.), of the communications terminal and form the basis of operation of the rich execution environment (REE) of the operating system installed in the communications terminal. This secured processor and this secured memory (which therefore form a secured space within the communications terminal) can for example be integrated into a trusted execution environment (TEE) that is delivered to the manufacturer of communications terminals. As an alternative, this trusted execution environment takes the form of a specific mode of execution of the main processor of the communications terminal.

This trusted execution environment is also complemented by a secure element (SE), the function of which, in the framework of the present technique, is to dialog with a virtual payment terminal. Several types of services (12) which require that an authorization be obtained to carry out associated transactions are pre-defined within this secure element (SE) (for example by means of dedicated integrated circuits capable of executing specific applications, also called applets). In order to enable a user to be capable of making payment transactions, the secure element (SE) integrates for examples types of pre-defined payment services corresponding to the different, most widespread payment schemes. By way of illustratory but non-exhaustive examples, we may cite the Visa® and MasterCard® payment schemes. Other types of service which are not necessarily linked to the field of financial transactions can also be pre-defined. (FIG. 1 presents an example of a secure element (SE) within which four types of services 12.1 to 12.4 are pre-defined but this example is purely illustrative: a secure element according to the proposed technique integrates at least one type of service). Each type of service pre-defined within a secure element is associated with a unique identifier (PAN_S) built in the same format as a bank card number (or PAN from "Primary Account Number"). Such a number comprises at least 16 digits: six first digits which constitute an issuer identification number (or IIN) followed by a variable number of digits (often 9 digits and up to 12 digits) identifying the card within the bank; and finally a last checksum digit. Each of these identifiers (PAN_S) is not only unique within a same secure element but also unique within all the commercially distributed secure elements. Thus, such a secure element given to a manufacturer of communications terminals contains, for each type of service that is pre-defined therein, an identifier that acts as a unique and unalterable signature and is built in the same format as a bank card number. Within this secure element, each type of service is stored in the same form as is the data contained in a bank card type of memory card (a type of service then behaves towards the exterior like a virtual bank card with its own number (PAN_S)).

When a user takes possession of a communications terminal integrating a transaction-securing module or secure element of this kind, he can, in a phase known as a provisioning phase, activate some of these types of services for which he wishes to be able to make an associated transaction through his communications terminal. For example, if the user wishes to be able to use his telephone to carry out payment transactions, he will activate the type of payment service corresponding to the type of card in his possession (for example Visa® payment or MasterCard® payment type of service). If the user wishes to use his telephone to obtain the benefit of increased security during certain operations made on a social network, he will activate the type of service associated with this social network. Here below in the document, the description focuses on the type of service corresponding to a Visa® payment (although this choice is given purely by way of an illustration and is not exhaustive).

Once the choice of a type of service to be activated has been made, the provisioning phase comprises a step for furnishing data associated with the particular service for which an authorization is required when a transaction is made. Thus, if the user wishes to be able to make a Visa® payment through his communications terminal he must, in this provisioning phase, provide the data associated with his Visa® bank card that is needed for carrying out a transaction: bank card number, card expiry date, bearer's name, visual cryptogram etc. This step can be performed by means of a manual entry of information present on the bank card or automatically, for example by using a photograph of the bank card made by means of the communications terminal (almost all communications terminals used by the wide public today incorporate photography means). An additional piece of data, called an "index" (IDX) is generated automatically by the communications terminal so as to make it possible to distinguish between different sets of data proper to a same type of service (a user having several Visa® bank cards should be capable of provisioning each of these cards: the unique identifier of the type of service (PAN_S) then enables the identification not only of a Visa® payment but also of the user who asks for it (this identifier being unique within the set of secure elements) and the index makes it possible to identify the set of data associated with the Visa® bank card that the user effectively wishes to use when a payment is made from his communications terminal.

The pieces of sensitive data associated with the service and furnished by the user (bank card number, expiry date, bearer's number, visual cryptogram etc.) are not stored within the communications terminal: they are transmitted to a transaction-processing server which stores them within a data structure, called a transaction data structure (StrTrs), where they are associated with the unique identifier of the type of service considered (in the present example, the PAN_S of the "Visa® payment" service for the communications terminal considered), and with the index generated automatically when they are furnished. The only pieces of information that remain stored within the communications terminal (in addition to the unique PAN_S identifiers already pre-defined within the secure element) are the index as well as a representation of the provisioned Visa® bank card (for example a photograph, an image and/or the last digits of its number) which will be subsequently useful to enable the user to more easily identify the card that he wishes to use (especially if he has provisioned several bank cards of the same type).

The provisioning of a service by the entry of data and the transmission of this data to a transaction-processing server is carried out under the at least partial control of the trusted execution environment (TEE) and/or of the secure element (SE). The data elements are transmitted after setting up a secured channel between the communications terminal and the processing server.

Asking for the activation of a given type of service with a transaction-processing server leads in return to the transmission to the user, through a secured transmission channel (for example directly by means of a secured channel or by other means such as postal delivery) of a personal identification number (PIN_S) or PIN code specifically linked to the unique identifier of the type of service activated (PAN_S) (this personal identification number is especially not the one associated with the user's real bank card). The association between the unique identifier of the type of service activated (PAN_S) and the corresponding personal identification number (PIN_S) is stored within a data structure, called an authorization data structure (StrAut), of this transaction-processing server. As an alternative, all the types of services pre-defined within a same secured module can be associated with the same personal identification number (PIN_S). This enables the defining of an overall personal identification number associated with the communications terminal and the user then has only one personal identification number to be memorized (rather than one per type of activated service). In this case of an overall number, the personal identification number associated with the communications terminal is for example generated and then transmitted to the user during his very first activation of an available type of service or it is communicated at the time of the acquisition of the communications terminal. This personal identification number can be intrinsically linked to the communications terminal (in this case it is unalterable and cannot be changed for a given communications terminal). As an alternative, it can be generated by software means in a transaction-processing server (it can be in this case renewed for a given communications terminal). As an alternative, the personal identification number can be defined, during activation, by the user himself and can be then transmitted to the server by the trusted execution environment of the communications terminal.

When the provisioning phase is finalized (at least one type of service has been activated by the user and he has received the appropriate personal identification number), then the method for processing a transaction from a communications terminal can be implemented.

5.2 Processing a Transaction

Figure 2:
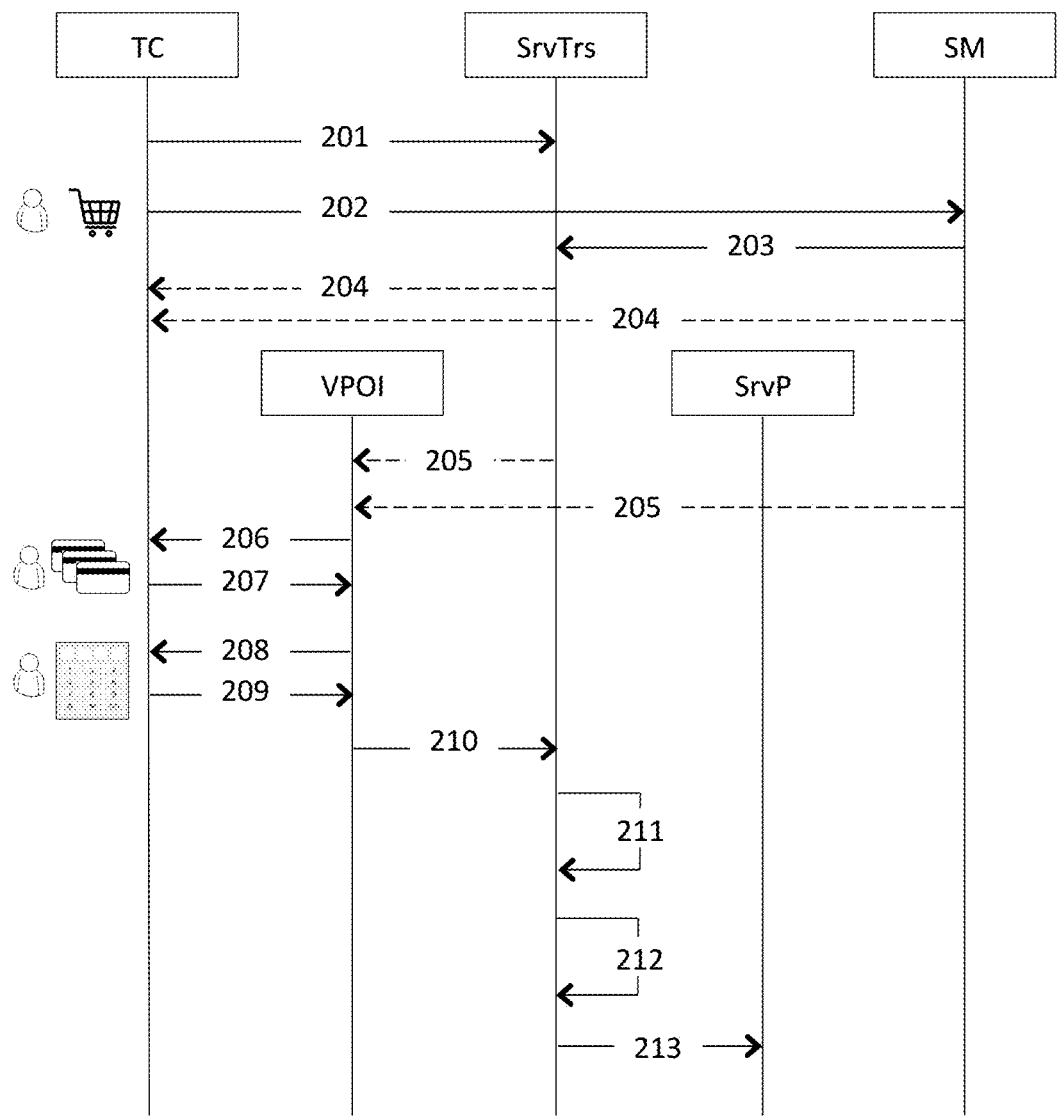
FIG. 2 is a sequence diagram of a case of use of the proposed technique in one particular embodiment.

Referring to FIG. 2, we describe a first case of use corresponding to an online payment made from a mobile communications terminal (TC) equipped with a secure element of this kind ("m-commerce" or mobile commerce type of payment). By way of an illustration, it is assumed that, during a provisioning phase as described here above, the user who owns the mobile communications terminal (TC) (typically a smart phone or a tablet) has preliminarily activated the type of service associated with the Visa® payment and that he has thus provisioned the data on the two Visa® bank cards in his possession.

When the user powers on his mobile communications terminal (TC), this terminal sends out (201) a registration request to a transaction-processing server (SrvTrs). This registration request enables the transaction-processing server (SrvTrs) to be informed of the availability of said communications terminal (TC) for the implementing of transactions in a "card present" mode. Conversely, when the communications terminal is powered off, it is de-registered from the transaction-processing server (for example by means of a registration cancelling request sent out by the communications terminal just before it is turned off, addressed to said transaction-processing server). As an alternative, the powered-on communications terminal can also regularly (at given time intervals) send out requests for confirmation of availability, addressed to the transaction-processing server. So long as this server receives this request, it assumes that the communications terminal is available to implement the transaction according to the proposed technique.

Using this mobile communications terminal, the user gets connected to a merchant site (SM) (for example by means of a dedicated application proper to the merchant site or again simply by access to the merchant's Internet site through a browser) and therein creates a basket of purchases.

When the user validates (202) his basket to make payment, the merchant site (SM) informs (203) the transaction-processing server (SrvTrs) that a transaction is initialized.

The transaction-processing server (SrvTrs) (or the merchant server SM) then creates (204) a secured communications channel with the communications terminal (TC), and then, on an execution server within the communications network, it instantiates (205) a virtual payment terminal (VPOI) capable of exchanging information with said communications terminal by means of said secured communications channel. When the merchant server carries out the instantiation, it does so only after having received confirmation, from the transaction-processing server, that the user's communications terminal is capable of implementing a transaction with a virtual payment terminal.

Two types of exchanges are distinguished: exchanges of information between the virtual payment terminal (VPOI) and the trusted execution environment (TEE) of the communications terminal (TC) on the one hand and exchanges of information between the virtual payment terminal (VPOI) and the secure element (SE) of the communications terminal (TC) on the other hand. The exchanges between the virtual payment terminal (VPOI) and the secure element (SE) take the APDU (Application Protocol Data Unit) form. This form defines the messages exchanged between a smart card and a smart-card reader. According to the proposed technique, the communications protocol between the secure element (SE) present in the mobile communications terminal (TC) and the virtual payment terminal (VPOI) instantiated by the transaction-processing server is therefore similar to the one implemented during exchanges between a physical bank card and a physical payment terminal. The virtual payment terminal (VPOI) sends out command APDUs addressed to an applet executed in the secure element and associated with the type of service considered (for example the Visa® payment applet) which then responds to the virtual payment terminal by means of response APDU. The process for obtaining authorization to carry out a transaction through a communications terminal is then similar to the one made during a payment transaction in "card present" mode (the secure element of the communications terminal then acts as a bank card using at least one of the applets installed therein, and the virtual payment terminal behaves like a classic payment terminal).

When the basket is validated, the instantiated virtual payment terminal (VPOI) sends the communications terminal a message asking (206) for the presentation of a payment card. When several sets of data (in other words several virtual cards) have been associated with the same type of service, the trusted execution environment (TEE) takes charge of displaying the representations of the virtual cards available so that the user can select one of them to make payment. In the present example, the user thus has a choice available between two virtual Visa® cards (associated by the user of the Visa® payment type service during the provisioning phase). Thus, this request is intended for the trusted execution environment (TEE) of the communications terminal which is then capable, through a dedicated application, of presenting the user with a representation of the virtual cards at his disposal with reference to a given type of service. This representation (which may consist for example of a photograph, an image or again a display of the last digits of the real bank card number that it represents) enables the user to identify the card that he wishes to use in order to carry out the payment transaction and to select this card.

When this choice is made, the communications terminal then knows the type of service associated with the transaction to be made (in this case a Visa® payment), identified uniquely by his identifier of type of service (PAN_S) as well as the set of data to be used associated with said type of service (herein the set of data associated with one of the two Visa® cards provisioned by the user), identified by its index (IDX). The secure element of the communications terminal transmits (207) this information—service type identifier (PAN_S) and index representing a set of data to be used (IDX)—to the virtual payment terminal (VPOI) in the form of an APDU via the appropriate applet which is executed within it.

The index representing a set of data to be used corresponds to a piece of data that is generally not exchanged in classic communication between a physical bank card and the physical payment terminal: indeed, in this situation, there is normally never any uncertainty about the bank card (and therefore the set of data) to be used since the card in question is physically inserted into the reader (or physically brought close to the reader if the payment is contactless). In the proposed technique, the transmission of such an index to the virtual payment terminal (VPOI) proves however to be useful. Indeed, as its name indicates, the service type identifier (PAN_S) identifies only one type of service. Since a communications terminal can contain several virtual cards associated with a same type of service, this piece of information (PAN_S) is not sufficient on its own to identify the virtual card to be used and the index of the set of data to be used must also be transmitted. In order to transmit this index to the virtual payment terminal (VPOI) while complying with the framework of an APDU message, it is stored in an available field—for example the 9F10 field—of the APDU message.

This problem does not arise for the service type identifier (PAN_S) which is built on the model of classic bank card number and is therefore fully compatible with APDU type exchanges.

When these pieces of information are received (PAN_S, IDX), the virtual payment terminal (VPOI) then sends (208) the communications terminal a command for launching an application to enter a personal identification number (PIN code). This application—which presents the user with a PIN code entry interface—is executed within the trusted execution environment (TEE) of the communications terminal and, in this respect, it is outside the scope of action of the operating system installed in the communications terminal (TC). It therefore cannot be subjected to manipulation or deterioration caused by malicious programs potentially present in the user's communications terminal, and this ensures that the transaction will be secured to the maximum. Just as he would have done in a classic use of his physical bank card inserted into a physical payment terminal—in other words in a classic transaction in "card present" mode—the user then enters the personal identification number (a PIN code) which was sent to him at the provisioning phase, or when he has acquired the mobile communications terminal. Depending on the embodiments of the proposed technique, it may be a personal identification number proper to an activated type of service or again a personal identification number associated with the communications terminal itself (and therefore common to all the types of services pre-defined within it). It may be recalled that this personal identification number according to the proposed technique in no way corresponds to the PIN code associated with any physical bank card of the user, in the same way as the service type identifier (PAN_S), although it complies with the formal aspects of a bank card number, in no way corresponds to a card number of a physical bank card in the user's possession.

This personal identification number (PIN) entered is transmitted (209) in encrypted form to the virtual payment terminal (VPOI) which relays it (210) to the transaction-processing server or to the merchant server depending on which is the server originating the instantiation of the virtual payment terminal (in this case the merchant server relays the transmission to the transaction-processing server).

Then the transaction server, using the authorization data structure (StrAut) that associates the service type identifier (PAN_S) with the personal identification number expected for this service (PIN_S), verifies (211) that the personal identification number (PIN) entered by the user is truly identical with the one expected for the type of service considered.

If this is the case, the transaction is authorized. The transaction-processing server then, using the transaction data structure and depending on the identifier of the type of service (PAN_S) and the index of the virtual card to be used (IDX), retrieves (212) the set of data (JD) associated with this virtual card, which will enable the transaction to be carried out. In the context of a payment transaction, this set of data is for example constituted by information necessary for making a payment transaction in "card not present" mode: real bank card number, expiry date, visual cryptogram, possibly the bearer's name etc. Once the data is retrieved, the transaction-processing server transmits (213) these pieces of information (as well as other complementary information necessary for carrying out of the transaction, for example the amount to be paid in the context of a financial transaction) to a third-party server (SrvP) which is for example a payment server in the case of a payment transaction. This third-party server takes charge of finalizing the transaction.

The mechanism described in detail here below can also apply to other cases of use, especially the one where the user has his communications terminal, integrating the secure element and the virtual cards that he has provisioned within reach but is browsing on the merchant's site from another complementary communications device, for example a computer (this is an e-commerce type situation). In this case, an identification of the user on the merchant side, required to validate a basket of purchases, is transmitted to the transaction server which can then determine whether a communications terminal of the user is registered. If this is the case, the rest of the transaction goes ahead in the same way as would have happened it had been initiated from the user's mobile communication terminal: the choice of the card to be used and the entry of the personal identification number are done through the communications terminal integrating the secure element and not through the complementary communications device. This case of use is particularly interesting because it gives the user increased security in the processing of the transaction even when the complementary communications device does not belong to him and is likely to be poorly secured or even compromised (for example if it is a third-party computer or a computer made available in public place such as a library).

5.3 Embodiments of the Method for Processing a Transaction

Figure 3:
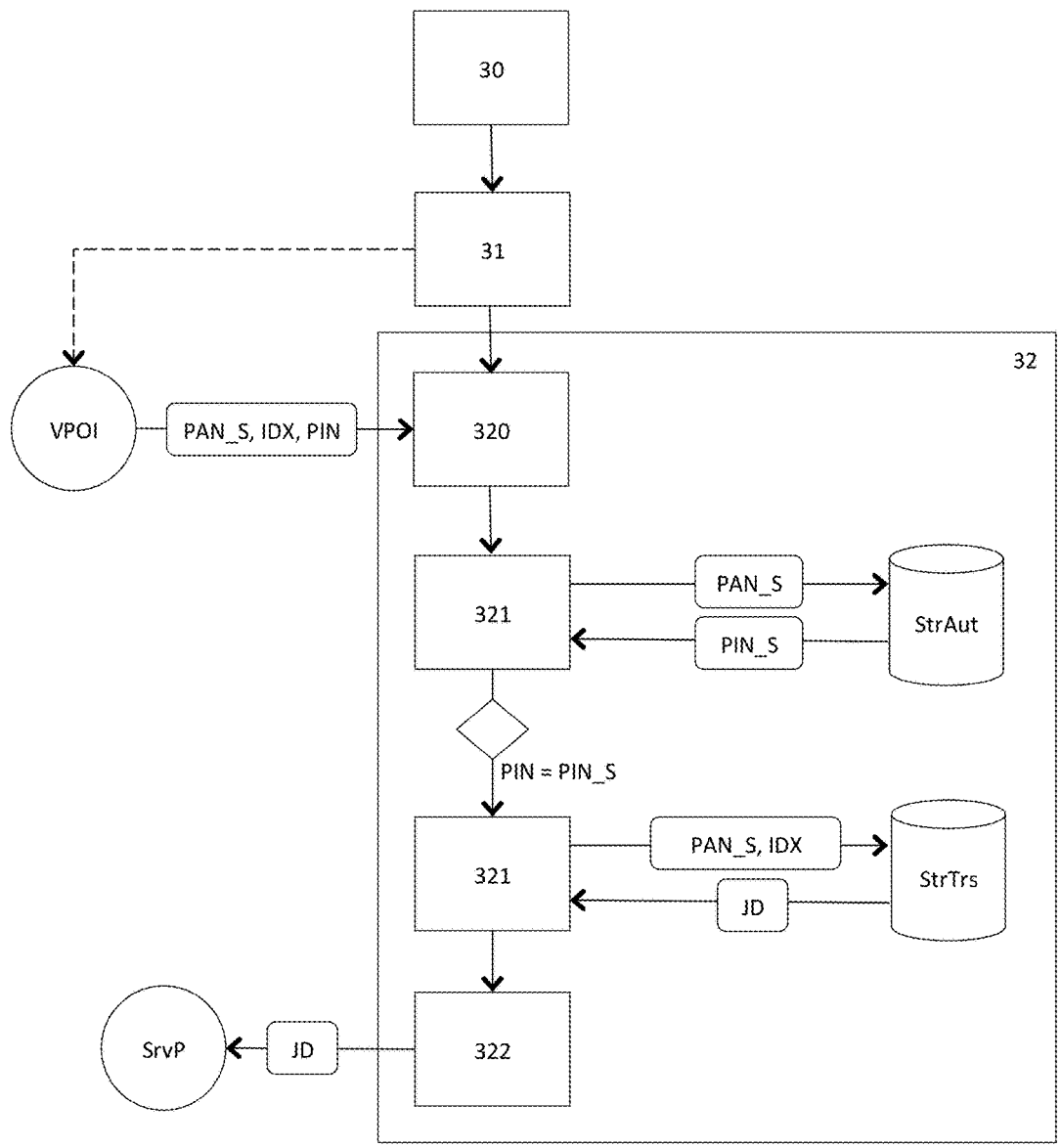
FIG. 3 illustrates the steps performed by a transaction-processing server to implement the proposed technique in one particular embodiment.

Referring to FIG. 3, we present the steps performed at the transaction-processing server in the implementation of the method for processing a transaction according to one particular embodiment of the proposed technique. This method of processing a transaction comprises;

a step (30) for creating a secured communications channel with the communications terminal (TC);

a step of instantiation (31) of a virtual payment terminal (VPOI) capable of exchanging information with said communications terminal by means of said secured communications channel;

a step of reception (320) from said virtual payment terminal (VPOI) of the service type identifier (PAN_S) corresponding to the transaction to be performed through said communications terminal, the index (IDX) corresponding to the set of data to be used to make said transaction and a a step of verification (321) of matching between said personal identification number entered (PIN) and the personal identification number expected (PIN_S) for the type of service considered (PAN_S) using the authorization data structure (StrAut);

when said verification is possible, a step (322) for obtaining data (JD) necessary for continuing the transaction, by means of the transaction data structure (StrTrs), depending on the identifier of said type of service (PAN_S) corresponding to the transaction to be performed by means of said communications terminal and said index (IDX) corresponding to the set of data to be used;

a step of transmission (323) of said set of data (JD) to a third-party server (SrvP) capable of performing the transaction.

Thus, the transaction-processing server is capable of instantiating a virtual payment terminal capable of communicating with a secure element of a communications terminal according to a protocol similar to the one implemented during exchanges between a physical bank card and a physical payment terminal. The information obtained by the virtual payment terminal (VPOI) is communicated to the transaction payment server which can thus evaluate whether the transaction can be authorized or not and if necessary communicate the data for the performance of this transaction to a third-party server.

In one particular embodiment, the method for processing a transaction comprises, prior to the step (30) for creating a secured communications channel with the communications terminal (TC), a step for receiving at least one request for registering said communications terminal (TC) with said transaction-processing server. Thus, the transaction-processing server is capable of determining whether a communications terminal is really powered on and therefore available to participate in implementing the processing of a transaction according to the proposed technique.

In yet another particular embodiment, the transaction-processing method comprises, prior to the step (30) for creating a secured communications channel with the communications terminal (TC), a step for receiving a request for initializing a transaction, coming from a merchant server. The merchant server hosts, for example, a merchant site with which a payment transaction must be made, or any other service offering the possibility of carrying out transactions for which an authorization is required.

In one particular embodiment of the proposed technique, in the event of a negative result for the verification of the matching between the personal identification number entered (PIN) and the personal identification number expected (PIN_S) for the type of service considered, the virtual payment terminal (VPOI) can ask the user to re-enter his personal identification number. The number of failed attempts can be counted and the transaction-processing server can decide to definitively reject the transaction beyond a certain number of incorrect entries (for example three).

In one particular embodiment of the proposed technique, the personal identification number entered by the user is encrypted or it is transformed by a hash function within the communications terminal of the virtual payment terminal and then transmitted to the transaction-processing server. The match between the personal identification number entered (PIN) and the personal identification number (PIN_S) expected for the type of service considered is then verified out after decryption of the encrypted personal identification number received (in the case of encryption) or through a comparison of fingerprints (in the case of a hashing).

In the example developed here above throughout this document—the performance of a payment transaction using a communications terminal—it is interesting to note that the proposed technique enables the implementing of a hybrid mode of transaction bringing into play both a part of the mechanisms implemented within the framework of a payment transaction in "card present" mode and a part of the mechanisms implemented in the framework of a transaction in "card not present" mode:

authorization to carry out a transaction is obtained according to mechanisms similar to those that are implemented during the performance of a transaction in "card present" mode and that ensure increased security of the transaction;

nonetheless, once this authorization is obtained, the same mechanisms as those implemented during the performance of a transaction in "card not present" mode are used to finalize the transaction, namely the transmission of the pieces of information as recorded on a bank card (card number, expiry date, visual cryptogram, bearer's name) to a payment server. These pieces of information are retrieved in a transaction data structure (StrTrs) of the transaction-processing server from the identifier of the type of service (PAN_S) for which it is desired to make a transaction, and the index (IDX) that serves to identify the set of data to be used to finalize this transaction.

According to another aspect of the proposed technique, a communications terminal, such as the one described in the present application, which includes a secure element within which are defined types of service and especially types of payment service corresponding to different types of bank cards payment schemes capable of being provisioned, enables a contactless payment transaction in association with a physical payment terminal (and no longer a virtual payment terminal). In this case the communications terminal and the payment terminal must include contactless communications means adapted to this type of use, for example near-field communication (NFC) means. The method implemented is the same as the one described here above. The only change consists in implementing a physical payment terminal instead of a virtual payment terminal. The APDUs exchanged between the communications terminal (SE) and the payment terminal are then transported by a transport protocol based on NFC rather than by using the IP protocol.

5.4 Associated Devices

Referring to FIG. 4, we describe a transaction-processing server comprising means enabling the execution of the transaction processing method described here above. Thus, such a transaction processing server comprises:

means for creating a secured communications channel with said communications terminal;

means of instantiation, within an execution server on said communications network, of a virtual payment terminal (VPOI) capable of exchanging information with said communications terminal by means of said secure communications channel;

means of processing transactions between the communications terminal and said virtual payment terminal (VPOI) implementing at least one secure element of said communications terminal, said secure element being configured to exchange an identifier of the type of service.

For example, the transaction-processing server comprises a memory 41 constituted by a buffer memory, a processing unit 42, equipped for example with a microprocessor and driven by the computer program 43, implementing the steps necessary for processing a transaction according to the proposed technique.

At initialization, the code instructions of the computer program 43 are for example loaded into a memory and then executed by the processor of the processing unit 42. The processing unit 42 inputs (I) for example a request for initializing a transaction, coming from a partner server (for example a merchant site). The microprocessor of the processing unit 42 implements the steps of the method, according to the instructions of the computer program 43, to enable the processing of the transaction, and notifies a decision to authorize or reject a transaction at output (T).

To this end, the transaction-processing server comprises, in addition to the buffer memory 41, means of data transmission/reception that can take the form of a connection interface with one or more communications networks, these means making it possible if necessary to set up a link with mobile communications servers or partner servers. These may be software interfaces or hardware interfaces (of the network card type or hardware network communications module type). According to the invention, such a server furthermore comprises storage means that can take the form of a database or an access to such storage means. These storage means comprise especially, on the one hand, the data structure that hosts the associations between service type identifiers and corresponding personal identification numbers, and, on the other hand, the data structure that hosts the associations between service type identifiers, indexes and sets of data to be used to carry out a transaction.

The proposed technique also refers to a communications terminal comprising means for provisioning a virtual card representing a user's bank card, said communications terminal comprising:

means for selecting a type of service with which said virtual card must be associated, from among a set of types of pre-defined services within said communications terminal;

means for obtaining a set of data associated with said bank card;

means for registering a representation of said bank card, said representation belonging to the group comprising:
a photograph of said bank card;
an image representation of said bank card;
a sub-set of the card number of said bank card;

means for generating and storing an index (IDX) associated with said set of data.

The invention claimed is:

1. A method comprising the following acts performed by a transaction-processing server:

receiving over the communications network a registration request from a communications terminal, wherein the registration request informs the transaction processing server that the communications terminal is available for implementing transactions in a card-present mode;

receiving, over the communication network, information sent by a merchant server that a transaction is initialized, the transaction involving the communications terminal and being a card-not-present mode of transaction;

in response to receiving the information, creating a secured communications channel with the communications terminal;

instantiating a virtual payment terminal configured to exchange information with at least one secure element of said communications terminal in the form of Application Protocol Data Units (APDUs) formatted as a card-present mode of transaction, by using said secured communications channel created by the transaction-processing server; and after instantiating the virtual payment terminal:

receiving, from said secure element, via said virtual payment terminal:

a unique service identifier representing a service associated with said transaction, the service identifier being formatted as a bank card number transmitted within an Application Protocol Data Unit (APDU) exchanged between the secure element and the virtual payment terminal;

an index associated with a selected bank card of the user from among a set of at least one bank card of the user that is associated with the service identified by the service identifier, the index being transmitted in a 9F10 field of the Application Protocol Data Unit (APDU) exchanged between the secure element and the virtual payment terminal; and a personal identification number entered into said communications terminal;

verifying that there is a match between said personal identification number entered and a personal identification number expected for said service associated with said transaction;

in response to said verification being positive, using the received service identifier and the index to retrieve from an authentication database a set of data associated with the user's selected bank card, said set of data comprising a card number, a visual cryptogram, and an expiry date of the user's selected bank card; and transmitting over the communications network said set of data to a third-party server in the card-not-present mode of transaction.

2. The method according to claim 1, wherein said service identifier is composed of sixteen digits.

3. A transaction-processing server, wherein the server which comprises:

a processor; and at least one non-transitory computer-readable medium comprising computer-implemented instructions executable by the processor, which configure the transaction-processing server to perform acts comprising:

receiving, over the communication network, information sent by a merchant server that a transaction is initialized, the transaction involving the communications terminal and being a card-not-present mode of transaction;

in response to receiving the information, creating a secured communications channel with the communications terminal;

instantiating a virtual payment terminal configured to exchange information with at least one secure element of said communications terminal in the form of Application Protocol Data Units (APDUs) formatted as a card-present mode of transaction, by using said secured communications channel created by the transaction-processing server; and after instantiating the virtual payment terminal:
receiving, from said secure element, via said virtual payment terminal:
a unique service identifier representing a service associated with said transaction, the service identifier being formatted as a bank card number transmitted within an Application Protocol Data Unit (APDU) exchanged between the secure element and the virtual payment terminal;
an index associated with a selected bank card of the user from among a set of at least one bank card of the user that is associated with the service identified by the service identifier, the index being transmitted in a 9F10 field of the Application Protocol Data Unit (APDU) exchanged between the secure element and the virtual payment terminal; and
a personal identification number entered into said communications terminal;
verifying that there is a match between said personal identification number entered and a personal identification number expected for said service associated with said transaction;
in response to said verification being positive, using the received service identifier and the index to retrieve from an authentication database a set of data associated with the user's selected bank card, said set of data comprising a card number, a visual cryptogram, and an expiry date of the user's selected bank card; and
transmitting over the communications network said set of data to a third-party server in the card-not-present mode of transaction.

4. A non-transitory computer-readable medium comprising a computer program product stored thereon, which comprises program code instructions for processing transactions, when the instructions are executed by a processor of a transaction-processing server, wherein the instructions configure the transaction-processing server to perform acts comprising:
receiving over the communications network a registration request from a communications terminal, wherein the registration request informs the transaction processing server that the communications terminal is available for implementing transactions in a card-present mode;
receiving, over the communication network, information sent by a merchant server that a transaction is initialized, the transaction involving the communications terminal and being a card-not-present mode of transaction;
in response to receiving the information, creating a secured communications channel with the communications terminal;
instantiating a virtual payment terminal configured to exchange information with at least one secure element of said communications terminal in the form of Application Protocol Data Units (APDUs) formatted as a card-present mode of transaction, by using said secured communications channel created by the transaction-processing server; and
after instantiating the virtual payment terminal:
receiving, from said secure element, via said virtual payment terminal:
a unique service identifier representing a service associated with said transaction, the service identifier being formatted as a bank card number transmitted within an Application Protocol Data Unit (APDU) exchanged between the secure element and the virtual payment terminal;
an index associated with a selected bank card of the user from among a set of at least one bank card of the user that is associated with the service identified by the service identifier, the index being transmitted in a 9F10 field of the Application Protocol Data Unit (APDU) exchanged between the secure element and the virtual payment terminal; and
a personal identification number entered into said communications terminal;
verifying that there is a match between said personal identification number entered and a personal identification number expected for said service associated with said transaction;
in response to said verification being positive, using the received service identifier and the index to retrieve from an authentication database a set of data associated with the user's selected bank card, said set of data comprising a card number, a visual cryptogram, and an expiry date of the user's selected bank card; and
transmitting over the communications network said set of data to a third-party server in the card-not-present mode of transaction.

* * * * *